Figure 1:
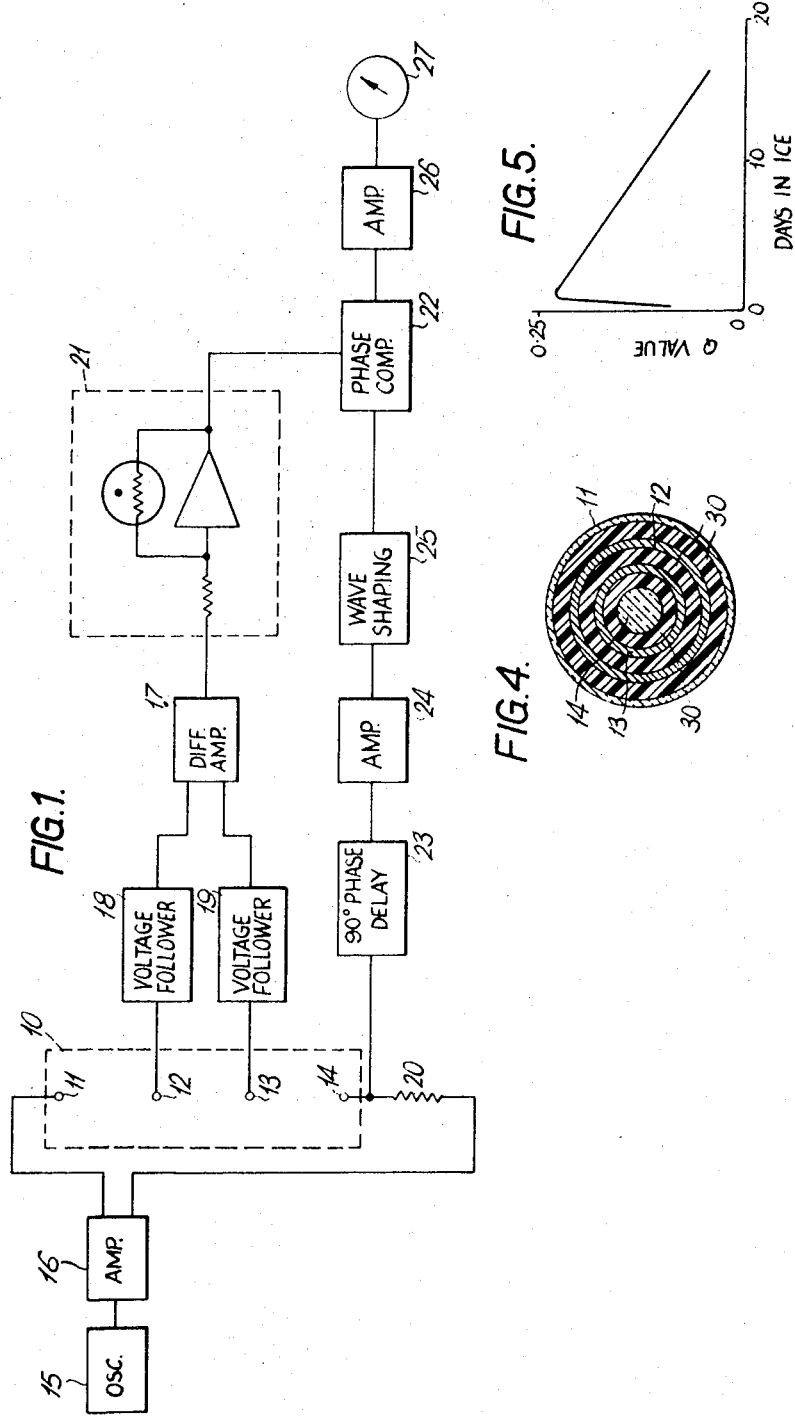

United States Patent
Lees et al.

[15] 3,665,302
[45] May 23, 1972

[54] METHODS AND APPARATUS FOR DETERMINING THE CONDITION OF FOOD

[72] Inventors: Alexander Lees; John Charles Shenstone Richards; Alfred Charles Jason, all of Aberdeen, Scotland

[73] Assignee: National Research Development Corporation, London, England

[22] Filed: Feb. 19, 1970

[21] Appl. No.: 12,568

[30] Foreign Application Priority Data

Feb. 24, 1969 Great Britain..................9,859/69

[52] U.S. Cl.....................324/64, 324/65 R, 324/71 R, 324/149

[51] Int. Cl..............G01r 1/06, G01r 25/00, G01r 27/02

[58] Field of Search.................324/65, 64, 57, 149, 71; 128/21.1

[56] References Cited

UNITED STATES PATENTS

| | | |
|---|---|---|
| 2,763,935 | 9/1956 | Whaley et al..................324/65 X |
| 3,218,552 | 11/1965 | Asmann et al..................324/65 |
| 3,320,946 | 5/1967 | Dethloff et al..................128/2.1 |
| 2,215,213 | 9/1940 | Ellis..................128/2.1 X |
| 2,231,035 | 2/1941 | Stevens et al..................324/61 R |
| 2,251,641 | 8/1941 | Stein..................324/61 R |

OTHER PUBLICATIONS

Langford–Smith – Radiotron Designers Handbook Radio Corporation of America, Harrison N.J. 1952 TK6663L34; Title Page and pp. 137–140.

Primary Examiner—Herman Karl Saalbach
Assistant Examiner—Marvin Nussbaum
Attorney—Cushman, Darby and Cushman

[57] ABSTRACT

A method and an apparatus are described for testing the condition of foods, particularly fish. It has been found that the dielectric properties of some foods vary with time and consequently that the electrical quality factor and phase angle of a food sample are indicative of the amount of spoilage of the food. A probe comprising two pairs of electrodes is described for use in measuring the phase angle of a sample. The construction of the probe and the apparatus coupled thereto prevents interfacial polarization where one pair of electrodes contact the sample, and hence one important source of error is overcome. The phase angle is found by passing a current through the sample and measuring the relative phase of the current and of a potential sensed between the electrodes of the said pair.

12 Claims, 5 Drawing Figures

METHODS AND APPARATUS FOR DETERMINING THE CONDITION OF FOOD

The present invention relates to the determination of the condition of biological foods in respect of the extent of spoilage, that is decay, and particularly but not exclusively the extent of spoilage of fish.

A method of determining the condition of fish is already known in which the ratio of the electrical impedances of a fish is found for two measuring frequencies; but this method is dependent on the positions of application of electrodes on the fish, it requires that the electrodes be entirely free from detritus and that the skin of the fish must be intact beneath the electrodes.

According to a first aspect of the present invention there is provided a method of determining the condition of a sample of a specified food including measuring an attribute of the sample which depends on at least one of the following dielectric properties of the sample: relative permittivity and specific resistance.

In this specification the specified foods are fish, meat, poultry, vegetables, fruit and any food with a cellular structure, for example milk, eggs and liquid foods, (such as alcoholic beverages).

The basis of the present method depends on the relationship of between the extent of spoilage and the said dielectric properties of the specified foods, or a combination of these properties.

A measure of the electrical quality factor or Q factor of a sample of material placed in contact with two electrodes, considered as a capacitor in which power is dissipated when an alternating current flows between the electrodes, is expressed as the ratio of the resistance to the reactance measured between the electrodes. It is convenient to regard the electrical behavior of the sample as being equivalent to that attributable to a capacitance C and a resistance R connected in parallel. When measured at a frequency $f$, $Q = 2C\pi fR$. $Q$ is dimensionless, and because the product of $C$ and $R$ remains the same for any given combination of electrode size and separation, $Q$ does not depend on the configuration of the dielectric material, provided that its properties are isotropic with respect to the direction of the potential gradient of an electric field applied during measurement.

Both the equivalent parallel capacitance $C$ and the equivalent parallel resistance $R$ of many foods have been observed to change progressively after harvesting. Particularly, in the case of fish kept in chill-storage (ideally at a temperature of 0° C.), both the capacitance and the resistance decrease with time of storage and for many species the decrease is monotonic after the onset of rigor mortis. Thus it will be readily understood that the $Q$ factor will also decrease with time, and that time post mortem can be inferred from the relationship between $Q$ factor and time. The measurement of capacitance or resistance independently can also be used to infer the time post mortem of fish. However, since the measurement of either one or other of these quantities has the disadvantage of being dependent on the geometry both of the measuring electrodes and of the sample and, in the case of measurements made on unskinned fish, of giving less consistent behavior, it is therefore preferred that the method, according to the first aspect of the present invention, includes the determination of the $Q$ factor of a sample of the specified food.

The method according to the first aspect of the present invention is useful in the preliminary testing which is carried out before certain methods of manufacture are carried out. For example in producing smoked, dried or frozen fish, or in canning or grinding fish, the fish are first subject to quality control which may include the determination of the extent of spoilage.

The method of determining $Q$ factor preferably includes the determination of the phase angle $\phi$ (in radians) of the sample, since it may readily be shown that in the range of interest (where the $Q$-value is approximately 0.2 or less) the phase angle $\phi = Q$ to a sufficiently high accuracy, where $\phi$ is the angle by which a vector representing the current in a sample leads a vector representing the potential measured across a sample.

Attempts have been made in the past to measure the electrical properties of biological materials at audio frequencies and below, but such measurements have usually provided inaccurate results owing to the effects of the formation of impedances between the electrodes and the materials due to interfacial polarization. Accurate measurements can only be made if virtually no current is drawn by the measuring electrodes.

According to a second aspect of the present invention there is provided apparatus for determining the condition of a sample of a specified food, including first and second pairs of electrodes adapted to make contact with a sample of food, means for passing a current between the first pair of electrodes, sensing means for sensing the potential between the second pair of electrodes, without drawing sufficient current to cause substantial interfacial polarization between the electrodes of the second pair and the sample, and means for deriving from the current and the potential, signals representative of an attribute of the sample which depends on at least one of the said dielectric properties of the food.

The attribute may be the capacitance or resistance of the sample (or part thereof) but where it is the $Q$ factor the means for deriving signals preferably includes measuring means for measuring the phase angle $\phi$ of the sample by finding the phase angle between the current and the potential.

According to a third aspect of the present invention there is provided an electrical probe for use in the apparatus for determining an attribute of a sample, including an electrode inside, but insulated from a hollow electrode of material which does not form a rectifying junction when placed in contact with a biological food, one end of the hollow electrode being in substantially the same plane as one end of the other electrode.

A pair of the probes is conveniently contained in a probe head.

The inner electrode is preferably of metal and the outer electrode is preferably of carbon.

Where two such probes are used in the apparatus for determining quality factor, the carbon electrodes form the first pair of terminals and the metal electrodes form the second pair of terminals.

One probe is required if the metal electrode is hollow and contains a further hollow metal electrode which itself contains a further carbon electrode, all the electrodes being insulated from one another, and having one end in a single plane.

One such probe may then be used in the apparatus for determining quality factor, with the two carbon electrodes forming the first pair of terminals, and the two metal cylinders forming the second pair of terminals.

Figure 2:
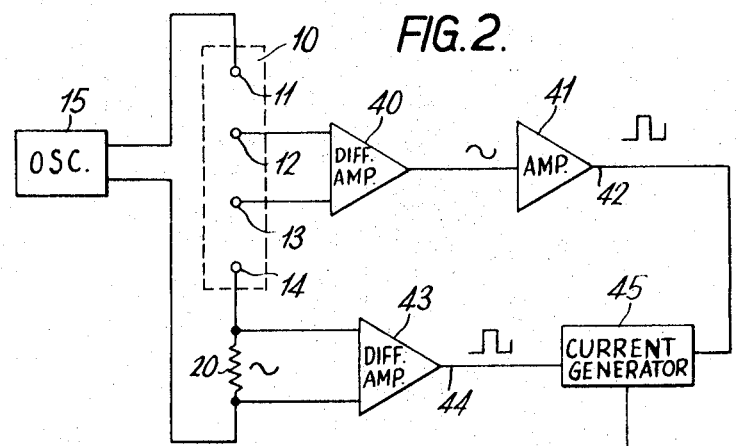
Figure 3:
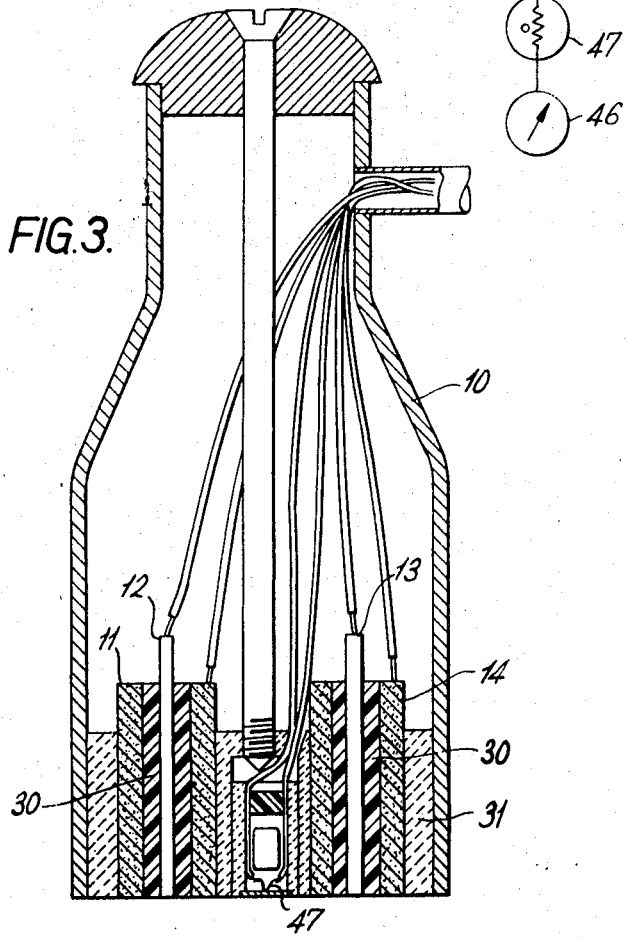

Certain embodiments of the invention will now be described, by way of example, with reference to the accompanying drawings, in which:

FIG. 1 is a block diagram of one embodiment of apparatus according to the second aspect of the invention, FIG. 2 is a block diagram of another embodiment of apparatus according to the second aspect of the invention, FIG. 3 is a longitudinal section of part of an embodiment of a probe according to the third aspect of the invention, FIG. 4 is an end view of a further embodiment of a probe according to the third aspect of the invention, and FIG. 5 is a graph showing the way in which $Q$-value changes with time post mortem for certain species of fish.

To measure the extent of spoilage in a sample of fish using the apparatus of FIG. 1, four electrodes 11, 12, 13 and 14, of a probe 10 are placed in contact with the sample. A sinusoidal C.M.F. at a frequency of 2 kHz from an oscillator 15 is applied to an amplifier 16 which provides a source of current to the sample via electrodes 11 and 14 and a resistor 20 connected in series with the sample. The signal developed across that part of the sample between the pair of potential electrodes 12 and 13, is applied to a differential amplifier 17, by way of two high impedance voltages follower circuits 18 and 19. The impedances of these circuits exceed approximately $10^7$ ohms so that virtually no current is drawn by the potential electrodes 12 and 13 and the effects of polarization are avoided. One way of designing a voltage-follower circuit having this very high input impedance is to use a high gain operational amplifier having a first stage which includes a field effect transistor as its main element. The electrodes 12 and 13 are then connected to the gate terminals of the field effect transistors in the appropriate voltage-follower circuits.

The output signal from the differential amplifier 17 passes to a voltage control amplifier 21 whose output signal is constant but in phase with the input signal, provided that a certain minimum input signal is received. For example, to provide an output signal of constant amplitude, a thermistor of suitable characteristic completes the feedback loop of the amplifier 21 which is an operational amplifier. The output signal from amplifier 21 is fed into a phase-sensitive detector 22.

The signal developed across the resistor 20 is delayed in phase by 90° by a phase delay network 23, amplified by an amplifier 24 and formed into a square-wave by a wave-shaping circuit 25. The shaped signal is then applied to a gate in the phase-sensitive detector so that the gate is open for alternate half-cycles of the square-wave.

Alternate portions (of half-cycle duration) of the signal from the potential electrodes 12 and 13 pass to a smoothing circuit (not shown) which integrates its input signal. The integrated signal is amplified by amplifier 26, connected to a direct current meter 27.

When the signal from the potential electrodes is exactly 90° out of phase with the signal from the resistor 20, that is when the sample is purely resistive, each alternate portion of the signal passing the comparator 22 has an average value of zero and the meter reads zero; but when capacitance is present and the phase difference differs from 90°, that is as the phase angle $\phi$ increases, alternate portions have an average which is not zero and the meter indicates a current proportional to the phase angle. The meter indication remains independent of the amplitude of the potential difference between the potential electrodes by virtue of the voltage control amplifier 21.

FIG. 2 shows an improved apparatus that can be used instead of the apparatus of FIG. 1. Where a component has the same function as in FIG. 1 it has been designated in the same way. Waveforms present at certain portions of the apparatus are shown adjacent to the appropriate portion.

As in FIG. 1 to measure the extent of spoilage in a sample of fish, four electrodes 11, 12, 13 and 14, of a probe head 10 are placed in contact with the sample. A sinusoidal e.m.f. at a frequency of 2 kHz supplied by the oscillator 15 provides a source of current to the sample via the electrodes 11 and 14 and a resistor 20 connected in series with the sample. The signal developed across that part of the sample between the pair of potential electrodes 12 and 13, is applied to a differential amplifier 40. As before the input impedances of the differential amplifier exceed approximately $10^7$ ohms so that virtually no current is drawn by the potential electrodes 12 and 13 and the effects of polarization are avoided.

The sinusoidal output of the differential amplifier 40 is fed to an amplifier 41 of sufficiently high gain such that its output signal at a point 42 has a rectangular waveform whose positive-going leading edge occurs at the same time as the sinusoidal input signal derived from electrodes 12 and 13 passes through zero.

The sinusoidal signal developed across the resistance 20 is applied to a differential amplifier 43, which is similar to the amplifier 41 in that it provides an output signal at a terminal 44 which has a rectangular waveform with a positive-going leading edge which occurs at the same time as the sinusoidal input signal derived from resistor 20 passes through zero.

The positive-going leading edge of the signal at terminal 44 causes a current generator 45 to pass a current of fixed value $i_1$ through a meter 46; when, next in sequence, the positive-going leading edge of the signal at terminal 22 occurs, the current generator ceases to pass any current through the meter. Since the impedance between electrodes 12 and 13 is capacitative, the alternating voltage developed across resistance 20 will lag that from the electrodes, the time lag $\Delta t$ being related to the phase angle $\phi$ by the relationship $\Delta t = \phi/2\pi f$. It will be readily understood that, since the current generator produces a current of fixed value, the average DC current $i_2$ measured by the meter will be $\phi i_1/2\pi$, provided that the response time of the meter is large in relation to $1/f$.

Since the surface temperature of a fish effects the phase angle measured, a thermistor 47 is connected in series with the meter 46. The resistance of the thermistor falls by 4 percent per degree centigrade and the quality factor of a fish sample falls by about 2 percent per degree centigrade, so that the resistance of the meter 46 and that of the thermistor at 0° C. are made equal. In FIG. 1 the thermistor may be connected as part of the feedback loop of the amplifier 21 or as an input resistor to the operational amplifier 26.

The electrodes 11 and 12 are formed into a probe (see FIG. 3), with the electrode 11 as a hollow graphite cylinder and the electrode 12 as a stainless steel rod within the cylinder. The rod and the cylinder are separated by insulation 30. An identical probe contains the electrodes 13 and 14, the stainless steel rod forming the electrodes 13. The two probes are fixed into a block of insulating material 31 forming part of the probe head 10 and are so mounted that they can be placed in contact with the sample.

The thermistor 47 is mounted, without encapsulation, in a semi-hemispherical recess of about the same radius as the thermistor in an aluminum disc 48. The surface of the disc adjacent to the thermistor is anodized and the thermistor is held in place by a layer of Araldite. The disc 48 is mounted in a Tufnol tube 49 serving as a guide for rigid copper wires to which the thermistor connections are soldered.

When the probes are applied to the surface of the sample during testing the potential electrodes 12 and 13 measure the true potential difference between the areas on the surfaces immediately beneath the current electrodes 11 and 14. While it is not essential to use the electrode configuration described, it is nevertheless desirable (in order to obtain a high signal-to-noise ratio) to take advantage of the fact that the maximum possible potential difference is obtained in this manner. If, for example, the probes were to consist of four electrodes in line, then the potential difference would be considerably less than in the configuration shown in FIG. 3.

Another form in which the four electrodes are combined together in one probe is shown in FIG. 4 where the electrode 11 is a graphite cylinder containing two coaxial stainless steel cylinders, one inside the other, forming electrodes 12 and 13, and the electrode 14 is a coaxial graphite rod inside the cylinder 13.

In operation, the probes of FIG. 3 (or that of FIG. 4) are held firmly against the surface of the food and the extent of the spoilage is indicated by the meter 24 which has previously been calibrated in terms of food condition, quality factor, or phase angle. FIG. 5 shows a typical relationship between Q-value and days in ice post mortem for a fish.

Except in the case of measurements made with the probe assembly shown in FIG. 4, the indications will depend to some extent on whether or not there is some structural orientation in the sample. In such cases the centers of contact of the potential electrodes should lie on a line of predetermined orientation with respect to the biological structure of the food. In the case of fish, orientation is conveniently fixed by aligning the probe centers parallel with the lateral axis of the fish.

Where whole fish are tested, the meter indication obtained will depend largely on the Q factor of the skin of the fish, a different result being obtained if its flesh alone is measured. An allowance must therefore be made, in determining condition, for whether whole fish or flesh samples are measured.

In testing samples of material having a dry outer surface, such as meat or poultry carcasses, measurements should be made on structured tissue. This may involve either cutting the material to expose this tissue or inserting the electrodes 12 and 13 into the tissue through the surface.

The probes of FIGS. 3 and 4 can be used to measure the resistance of a sample, by measuring the voltage between the electrodes 12 and 13, and the current passed between the electrodes 11 and 14. Clearly capacitance can be calculated from the measured phase angle. Instead the potential between the electrodes 12 and 13 can be applied to a differential amplifier. The resultant signal can then be used as a reference signal in two phase sensitive detectors. One detector receives the voltage between the electrode 13 and earth, and the other receives the same voltage after a phase shift of 90°. The output signals of the detectors are then representative of the resistive and capacitive components of the impedance of the sample.

Although apparatus for finding the extent of spoilage in fish has been specifically described, the invention is not limited to this apparatus (including the various electrode assemblies) and the methods specifically described.

We claim:

1. Apparatus for determining the condition of a sample of a specified food, including first and second pairs of electrodes adapted to make contact with a sample of food, means for passing a current between the first pair of electrodes, sensing means for sensing the potential between the electrodes of the second pair without drawing sufficient current to cause substantial interfacial polarization between the electrodes of the second pair and the sample, and means for deriving, from the current and the potential, signals representative of an attribute of the sample which depends on at least one of the said dielectric properties of the food, including measuring means for measuring the phase angle $\phi$ of the sample by determining the phase angle between the current and the potential.

2. Apparatus according to claim 1 wherein the measuring means includes means for deriving a voltage in phase with the current, delay means for changing the phase angle of the voltage by 90° to provide a gate control signal, and a gate circuit coupled to the delay means and the sensing means to be opened wherever the gate control signal has a predetermined polarity, to allow a signal in phase with the potential between the electrodes of the second pair to pass to integrating and indicating means.

3. Apparatus according to claim 2 wherein the means for sensing the potential between the second pair of electrodes includes two high-impedance input voltage-follower circuits and a differential amplifier, the electrodes of the second pair being coupled to the inputs of the differential amplifiers by way of the voltage-follower circuits respectively.

4. Apparatus according to claim 1 wherein the means for measuring the phase angle includes means for deriving a voltage in phase with the current and phase-comparison means for comparing the relative phases of the potential between the second pair of electrodes and the voltage.

5. Apparatus according to claim 4 wherein the sensing means and the measuring means include first and second circuits for forming square-wave signals having a fixed phase relationship with the said potential and the said voltage, respectively, and wherein a switched current source is coupled to the first and second circuits to provide a constant output current for integrating and indicating means during intervals between the occurrence of the leading or trailing edges of one square-wave signal and that of the following leading or trailing edge, respectively, of the other square-wave signal.

6. Apparatus according to claim 5 wherein the first said circuit includes a first high-impedance differential amplifier with input terminals coupled to the electrodes of the first pair, and the second said circuit includes a second high-impedance differential amplifier with input terminals coupled across a resistor in series with the electrodes of the first pair of electrodes and the means for passing current between the first pair of electrodes.

7. Apparatus for determining the condition of a sample of a specified food, including first and second pairs of electrodes adapted to make contact with a sample of food, means for passing a current between the first pair of electrodes, sensing means for sensing the potential between the electrodes of the second pair without drawing sufficient current to cause substantial interfacial polarization between the electrodes of the second pair and the sample, and means for deriving, from the current and the potential, a signal which is representative of the electrical quality factor $Q$ of the sample.

8. Apparatus for use in evaluating a material including first and second pairs of electrodes adapted to make contact with a sample of the material, means for passing a current between the first pair of electrodes, sensing means for sensing the potential between the second pair of electrodes without drawing a substantial current, and means for deriving from the current and potential a signal which is representative of a product CR where C is an equivalent capacitance and R is an equivalent resistance which when connected in parallel represent the electrical behavior of the sample.

9. Apparatus according to claim 7 wherein all the electrodes have one surface in a common plane, and in that plane one electrode of the first pair forms a loop containing the other electrodes, one electrode of the second pair forms a loop containing the other electrodes of the two pairs, and the other electrode of the second pair forms a loop containing the other electrode of the first pair.

10. Apparatus according to claim 7 wherein all the electrodes have one surface in a common plane, and in that plane each electrode of the first pair forms a loop containing a different one of the electrodes of the second pair.

11. Apparatus according to claim 7 wherein the electrodes of the first pair are of graphite while those of the second pair are of stainless steel.

12. A method for determining the condition of a sample of a specified food, comprising the steps of contacting:
first and second pairs of electrodes with a sample of food,
passing a current between the first pair of electrodes, sensing the potential between the electrodes of the second pair without drawing sufficient current to cause substantial interfacial polarization between the electrodes of the second pair and the sample, and
deriving, from the current and the potential, signals representative of an attribute of the sample which depends on at least one of the said dielectric properties of the food, including measuring the phase angle $\phi$ of the sample by determining the phase angle between the current and the potential.

* * * * *

UNITED STATES PATENT OFFICE
CERTIFICATE OF CORRECTION

Patent No. 3,665,302                 Dated May 23, 1972

Inventor(s) Alexander Lees et al

It is certified that error appears in the above-identified patent and that said Letters Patent are hereby corrected as shown below:

Column 2, line 71, change "C.M.F." to --E.M.F.--.

Column 5, line 30, in claim 1, delete "said".

Column 6, line 56, in claim 12, delete "said".

Signed and sealed this 11th day of February 1975.

(SEAL)
Attest:

RUTH C. MASON
Attesting Officer

C. MARSHALL DANN
Commissioner of Patents
and Trademarks